(12) United States Patent
Grollitsch

(10) Patent No.: US 7,703,596 B1
(45) Date of Patent: Apr. 27, 2010

(54) SYSTEM AND METHOD FOR CASE ORIENTING

(76) Inventor: Helmut Grollitsch, 1923 Hoskins Dr., Houston, TX (US) 77080

( * ) Notice: Subject to any disclaimer, the term of this patent is extended or adjusted under 35 U.S.C. 154(b) by 0 days.

(21) Appl. No.: 12/235,324

(22) Filed: Sep. 22, 2008

(51) Int. Cl.
*B65G 47/24* (2006.01)

(52) U.S. Cl. .................. 198/395; 198/399; 198/411; 198/416; 414/774; 193/48

(58) Field of Classification Search .............. 198/399, 198/411, 412, 416; 414/774; 193/48
See application file for complete search history.

(56) References Cited

U.S. PATENT DOCUMENTS

| | | | |
|---|---|---|---|
| 3,275,122 A | * | 9/1966 | Carlson ............... 198/399 |
| 3,937,381 A | * | 2/1976 | Lang et al. ............ 228/6.1 |
| 4,020,941 A | * | 5/1977 | Kennedy ............... 198/402 |
| 4,042,121 A | * | 8/1977 | Bartell ................. 414/728 |
| 4,122,938 A | * | 10/1978 | Walz et al. ............ 198/411 |
| 4,538,720 A | * | 9/1985 | Limousin .............. 198/416 |
| 4,706,798 A | * | 11/1987 | Hollmann ............. 198/399 |
| 2006/0131130 A1 | * | 6/2006 | Thurgood et al. ....... 198/416 |

FOREIGN PATENT DOCUMENTS

JP 57201137 A * 12/1982

* cited by examiner

*Primary Examiner*—Mark A Deuble
(74) *Attorney, Agent, or Firm*—Egbert Law Offices PLLC

(57) ABSTRACT

A case positioner system for orienting a case from an upended position to a corrected position has a frame, a conveyor translatably arranged relative to said frame, a bottom projection positioned below said conveyor, an abutment member interconnected to said frame and positioned above said conveyor, and a translator connected to the bottom projection. The bottom projection is movable between an upward position and a downward position. The abutment member is movable between an upper position and a lower position. The translator moves the bottom projection upstream on said conveyor when said abutment member is in said lower position.

20 Claims, 6 Drawing Sheets

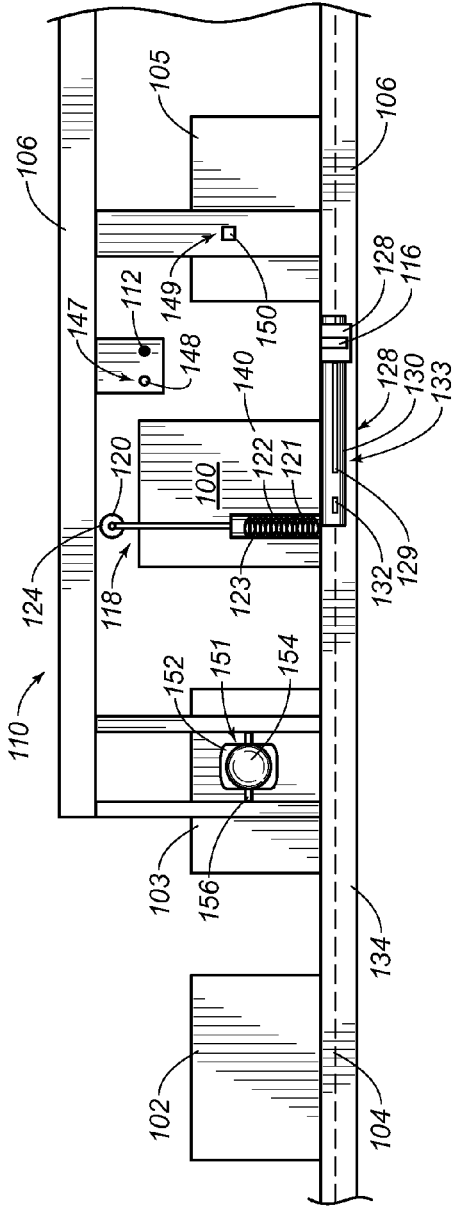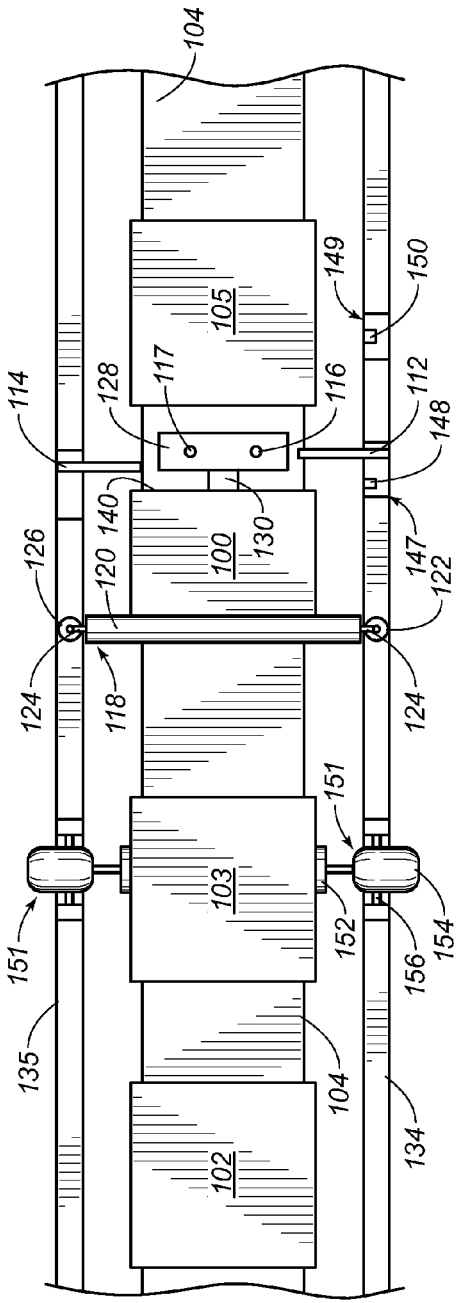

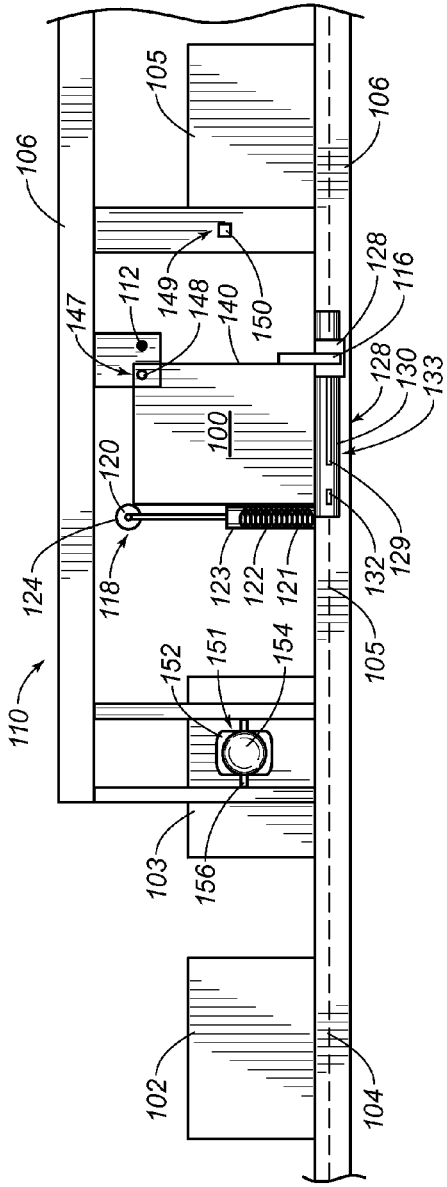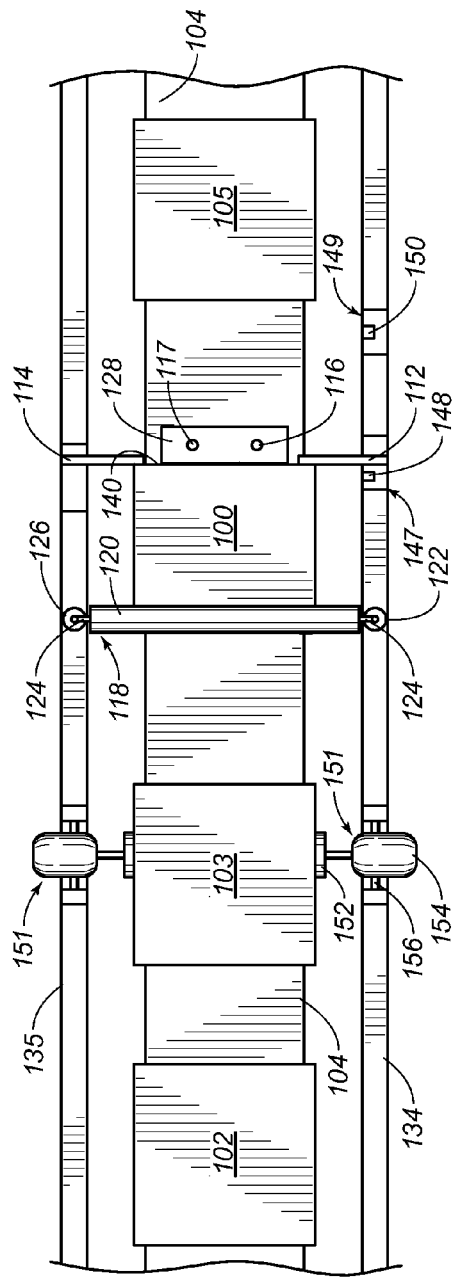

SYSTEM AND METHOD FOR CASE ORIENTING

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to cases that are used to store and transport containers therein. More particularly, the present invention relates to cases placed on a conveyor in an improper position. More particularly, the present invention the relates to devices that orient cases from an improper position to a proper position.

2. Description of Related Art Including Information Disclosed Under 37 CFR 1.97 and 37 CFR 1.98.

Cases and containers are often used for the transport of various objects from one location to another. In certain industries, it is common practice to place a plurality of fluid containers, such as milk bottles, cola bottles, alcoholic beverage containers, and other fluid containers within a single case. One type of case that is commonly employed is an injection-molded polymeric case having latticed walls. The bottom of the case is a closed end. The case has an open end opposite the bottom. The lattice walls extend between the closed end and the open end. A plurality of dividers are often used interior of the case so as to provide compartments into which to insert the various fluid containers.

In practice, it is common to stack these cases upon one another. Often the stacks can extend up to six feet in height. A large number of the cases can be stacked onto pallets. As a result, a forklift, or other transport vehicle, can be used so as to move the pallet, along with the stacked cases, from one location to another. Additionally, these cases are often stacked in very large quantities within the interior of a transport truck.

Unfortunately, given the generally rough handling conditions for these cases, a surface of the case can crack or otherwise be damaged. Because of the stacked nature of the transported cases, a crack in a case can propagate and cause the breakage of one of the lattice walls of the case. Any cases that are stacked upon the broken case have the potential for tilting or falling. As a result, the broken case not only can cause the destruction of the fluid containers within in the case, but can also result in a collapse of a stacked arrangement of cases. The result is not only the loss of the case, but also the loss of the products contained within the case. A great deal of labor is also required in order to repair the damage associated with the collapsed stack of cases. Experiments with the cases of this type have shown that there are approximately 30 broken cases out of every 7,000 units.

Because of the nature of these polymeric injection-molded cases, it is very difficult to visually see when a crack or split has occurred in one of the lattice walls of the case. The latticed nature of the walls of the case further obscures the ability to see a split. Visual inspection is generally inadequate in determining whether or not damage has occurred to the case. Manipulation by hand may determine if the case is damaged, but manual manipulation is a lengthy and time-consuming operation. Additionally, the strength that must be applied to determine whether a crack or split in the case has occurred may not be sufficient so as to properly indicate the damaged case. As such, a mechanical and automated technique is needed in order to determine whether or not a particular case has been damaged or defective.

Patents relating to devices for detecting the integrity of containers include U.S. Pat. Nos. 4,984,409; 6,088,995; 6,237,431; 3,955,408; 4,530,246; and 6,473,169. One of the problems associated with such systems is that the cases are sometimes placed on a conveyer in an improper, upended, position. As the conveyer moves the upended case through the system, the upended case can be improperly discarded as a defective case. Moreover, the upended case can sometimes jam the conveyer system so as to cause the system to stop. The stoppage leads to reduced productivity and loss of time. Moreover, the stoppage requires a person to manually remove the upended case from the conveyer system. Thus, there is a need for a technique to properly position an upended case on a conveyer system.

Various patents have issued relating to the proper positioning of the cases on conveyer systems. For example, U.S. Pat. No. 4,706,798, issued on Nov. 17, 1987 to Hollmann, discloses an overhead case positioner system for inverting upended cases. The system includes a detector for sensing the presence of an upended case moving along a conveyor, a first stop for retarding movement of the upended case, a second stop for retarding movement of the succeeding case, a third stop spaced downstream of the first stop for engaging the upended case after it has been released by the first stop and an inverter mechanism for pivoting an upended case in abutment with the third stop forwardly over the third stop.

U.S. Pat. No. 5,025,911 issued on Jun. 25, 1991 to Raasch et al., discloses a method and apparatus for tilting substantially rotationally symmetrical bodies from a shell surface thereof onto an end surface thereof. The body is moved in a given transport direction defining leading and trailing end surfaces of the body with the shell surface lying on a conveyor path. The movement continues until the body crosses a dividing plane. The dividing plane extends transversely between and defines edges of two path segments of the conveyor path. The body is stopped when the leading and trailing end surfaces are supported on different path segments. The edge of one of the path segments is subsequently selectively raised relative to the other of the path segments. The body is tilted about the raised edge onto the other of the path segments until the end surface located above the other of the path segments comes to rest on the other of the path segments. The tilted body is removed in the given transport direction.

U.S. Pat. No. 4,484,675, issued on Nov. 27, 1984 to Doherty et al., discloses a board turner apparatus and method capable of turning a board over several times for repeated inspection of both sides of the board for more accurate grading of such board before allowing the board to be conveyed forward past a retractable stop. The retractable stop means, when extended above the conveyor, engages the leading edge of the board at a fixed stop position along a conveyor means and keeps the board from advancing along the conveyor means until such stop means is retracted. The board inverter means includes a plurality of curved turner arms which pivot about the axis of a common support shaft between a lowered position below the upper surface of the conveyor and a raised position above such upper conveyor surface. The turner arms engage the leading edge of the board and cause it to pivot backwards about its trailing edge when such turner arms are pivoted from their lowered position to the raised position in an opposite direction to the movement of the conveyor.

U.S. Pat. No. 3,993,187, issued on Nov. 23, 1976 to Knez, discloses a method of turning a plurality of stackable cups to a position where the cups repose on their open and wider ends. The cups have a height which is less than the greatest diameter of the cups at their open ends. The cups are taken to a first zone on a continuously forwardly driven conveyor belt randomly assuming a position reposing on their bottom ends, reposing on their open ends or lying on one side. The cups are then moved through a second zone where those cups which are lying on one side are raised to a position where they repose on their open ends. Next, the cups are moved through a third zone where those cups reposing on their bottom ends are tipped over to a position where they repose their open ends. Finally, the cups are collected into a row and arranged after each other and led to a zone where the cups not reposing with their open ends on the belt are removed from the belt.

U.S. Pat. No. 3,863,757, issued on Feb. 4, 1975 to Kinney, discloses a method and apparatus for positioning concave articles on an upwardly moving elevator with the articles resting on a side portion thereof. The method includes the steps of moving the articles upwardly with the elevator, contacting a portion of the articles with a rotatable wheel positioned adjacent the elevator, moving the articles from the elevator to a commonly oriented position at one of first or second locations, and moving the commonly oriented articles from the first and second locations to a preselected location.

U.S. Pat. No. 3,024,890, issued on Mar. 13, 1962 to Belk, discloses an article handling apparatus that has a conveyer mounted for vertical movement, a latch arranged to releasably hold the conveyer in a raised position, and actuator located in the path of articles moving from the conveyer so that the articles engage and actuate the latch to release the conveyer for downward movement, and an article stop movably mounted adjacent the discharge end of the conveyer and arranged to be moved by the conveyer into the path of articles on the conveyer when the conveyer moves downward.

U.S. patent application Ser. No. 10/672,402, filed on Sep. 29, 2003 by the present inventor, discloses an apparatus for detecting a cracked or broken case that has a frame, a conveyor mounted on the frame, and a ram affixed to the frame for applying a force onto a surface of a wall of the case. A sensor is cooperative with the ram for detecting when the surface of the wall of the case has deflected beyond a desired amount. An ejector is affixed to the frame for removing the case from the conveyor when the sensor has detected that the wall of the case has deflected beyond the desired amount.

It is an object of the present invention to provide a case positioner that automatically orients a case from an upended position to a corrected position.

It is another object of the present invention to provide a case positioner that correctly positions cases before cases enter a case-inspection system.

It is another object of the present invention to minimize the number of good-case ejections from a case-inspecting system.

It is still another object of the present invention to provide a case positioner that automatically detects an upended case.

It is another object of the present invention to provide a case positioner that can adapt to any case-conveyer system.

It is still another object of the present invention to maximize the number of cases tested by a case-inspection system.

These and other objects and advantages of the present invention will become apparent from a reading of the attached specification and appended claims.

BRIEF SUMMARY OF THE INVENTION

The present invention is a case positioner system for orienting a case from an upended position to a corrected position comprising a frame, a conveyor translatably arranged relative to said frame, at least one bottom projection positioned below said conveyor, an abutment member interconnected to said frame and positioned above said conveyor, and a translation means connected to the bottom projection. The bottom projection is movable between an upward position and a downward position. The abutment member is movable between an upper position and a lower position. The translation means moves the bottom projection upstream on said conveyor when said abutment member is in said lower position.

The abutment member comprises a first piston-and-cylinder assembly positioned on an one side of said conveyor, a second piston-and-cylinder assembly positioned on an opposite side of said conveyor, and a cross-member extending between said first piston-and-cylinder assembly and said second piston-and-cylinder assembly in spaced relation above said conveyor. The cross-member has a roller rotatably mounted thereon. Each of said first and second piston-and-cylinder assemblies has a pneumatic cylinder with a coiled spring therein. The spring urges the piston toward said upper position. The abutment member is spaced above said conveyor for a distance greater than a vertical dimension of the case when in the upended position. The abutment member is spaced above said conveyor for a distance less than said vertical dimension of the case when in the upended position.

The translation means comprises a carriage having the bottom projection thereon, a track connected to said carriage such that said carriage moves therealong, and an actuator means connected to said carriage for moving said carriage between a downstream position to an upstream position. The track is positioned below said conveyor. A limit switch is interconnected to said track and positioned adjacent said upstream position. The limit switch is suitable for stopping the case when in said upstream position. At least one side projection is positioned above said conveyor in a position upstream of the bottom projection. The side projection is movable between an inward position and an outward position.

A sensing means is positioned downstream of the bottom projection. The sensing means senses another case downstream of the bottom projection. The sensing means also moves the side projection to said inward position when the another case is sensed by said sensing means. The sensing means also moves the side projection to said outward position when the another case is not sensed by said sensing means. The first sensing means is a photo eye positioned on said frame above said conveyor.

A detecting means is positioned upstream of the bottom projection. The detecting means detects the case in the upended position. The detecting means moves the bottom projection to said upward position and also moves said abutment member to said lower position when a case in an upended position is sensed. The detecting means comprises a photo eye that is positioned above said conveyor a distance greater than a height of the case in the corrected position above said conveyor and less than a height of the case in the upended position above said conveyor.

A braking means is positioned upstream of said abutment member. The braking means blocks a movement of another case on said conveyor when said detecting means detects the case in the upended position. The braking means comprises a pneumatic actuator that is positioned on one side of said conveyor, and an arm that extends outwardly of said pneumatic actuator when said detecting means detects the case in the upended position.

A case inspecting means has said conveyor extending therethrough. The case inspecting means tests an integrity of a wall of the case. The case inspecting means is downstream of the bottom projection.

The case has a bottom and a plurality of side walls extending therefrom. Each of the plurality of side walls has an edge opposite the bottom. The bottom projection is suitable for contacting the edge when in said upward position. The abutment member is suitable for contacting the bottom when in said lower position.

The conveyor has a top surface. The bottom projection has an end extending above said top surface when the bottom projection is in said upward position. The bottom projection is below or even with said top surface when in said downward position.

The present invention is a method for orienting a case from an upended position to a corrected position as the case moves on a conveyor. The method comprises detecting the case when in the upended position, moving a bottom projection upwardly into a position above a top surface of the conveyor so as to stop the movement of the case on the conveyor, moving an abutment member downwardly in a position below a top surface of the case and rearwardly of the case, translating said bottom projection upstream of the conveyor so as to move the case relative to the conveyor such that an upstream surface of the case contacts said abutment member, toppling the case by an interaction of the case with the translated bottom projection and the contact with said abutment member such that the case moves to the corrected position, moving the bottom projection downwardly when the case is in the corrected position, moving the abutment member upwardly when the case is in the corrected position, sensing a position of another case downstream of said bottom projection on the conveyor, extending a side projection inwardly when the another case is sensed, stopping the movement of the upended case by said side projection when the another case is sensed, and braking a movement of another case upstream of the case in the upended position when the case in the upended position is detected.

BRIEF DESCRIPTION OF THE SEVERAL VIEWS OF THE DRAWINGS

FIG. 5 shows a side elevational view of the preferred embodiment of the case positioner system of the present invention.

FIG. 6 shows a top view of the preferred embodiment of the case positioner system of the present invention.

FIG. 7 shows a top view of the case positioner system, with the edge of the case contacting the side projections.

FIG. 8 shows a side elevational view of the case positioner system of the present invention, with the bottom projection in the upward position.

DETAILED DESCRIPTION OF THE INVENTION

Figure 1:
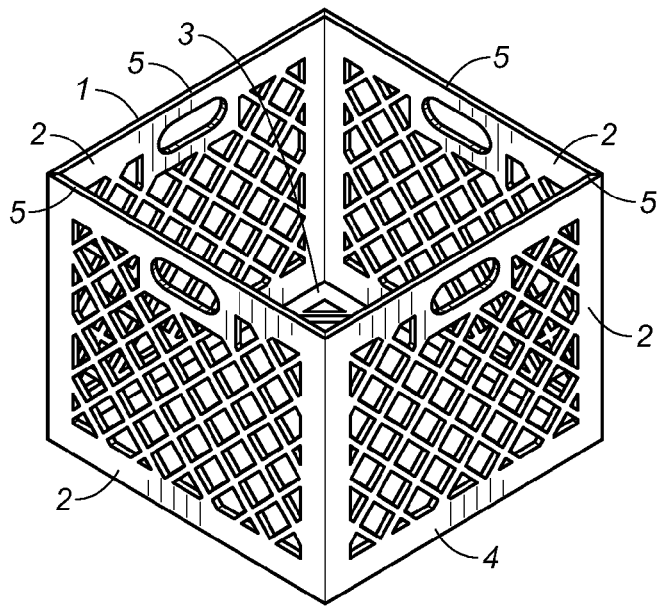
FIG. 1 shows a perspective view of a case.

Referring to FIG. 1, there is shown a perspective view of a case 1 that is typical of the cases that are positioned by the present invention. The case 1 has a bottom 3 and four side walls 2 that extend perpendicularly upwardly from the bottom 3. The side walls 2 and bottom 3 are rectangular in shape. The top of the case 1 is open. Typically cases 1 are formed of plastic, and the side walls 2 of the cases 1 have lattice work in the centers thereof. The case 1 typically holds containers of milk, but anything can be held in the case 1. The case 1 has a corner 4 between the bottom 3 and side walls 2. Each of the side walls 2 have an edge 5 opposite the bottom 3 of the case 1.

Figure 2:
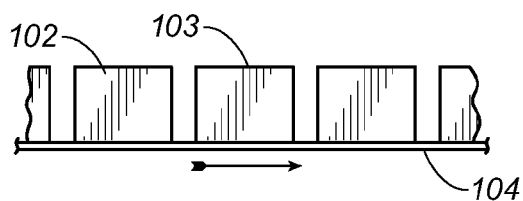
FIG. 2 shows a side elevation view of cases moving along a conveyer, with all the cases in the corrected position.

Referring to FIG. 2, there is shown a side elevational view of correctly positioned cases 102 on a conveyer 104. When in the corrected position, the bottoms 103 of the cases 102 face upwardly. The open tops of the cases 102 face downwardly to the conveyer 104. The arrow in FIG. 2 indicates the direction of movement of the conveyer 104, and consequently the cases 102 thereon.

Figure 3:
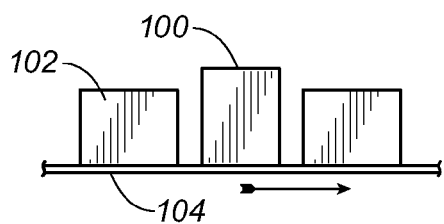
FIG. 3 shows a side elevational view of cases moving along a conveyer, with one of the cases being in an upended position.

Referring to FIG. 3, there is shown a side elevational view of a conveyer 104 with cases 102 and 100 thereon. Case 102 is in the corrected position. Case 100 is in an upended position. As can be seen, upended case 100 extends upwardly from the conveyer 104 further than the cases 102 in the correct position. That is, the height of the upended case 100 is greater than the height of the cases 102 in the correct position. The geometry of the upended case 100 causes the case 100 to enter into a case-inspecting machine in an improper orientation. Thus, the upended case 100 can cause a case inspecting machine to incorrectly reject the case 100, or the case 100 can cause the machine to jam.

Figure 4:
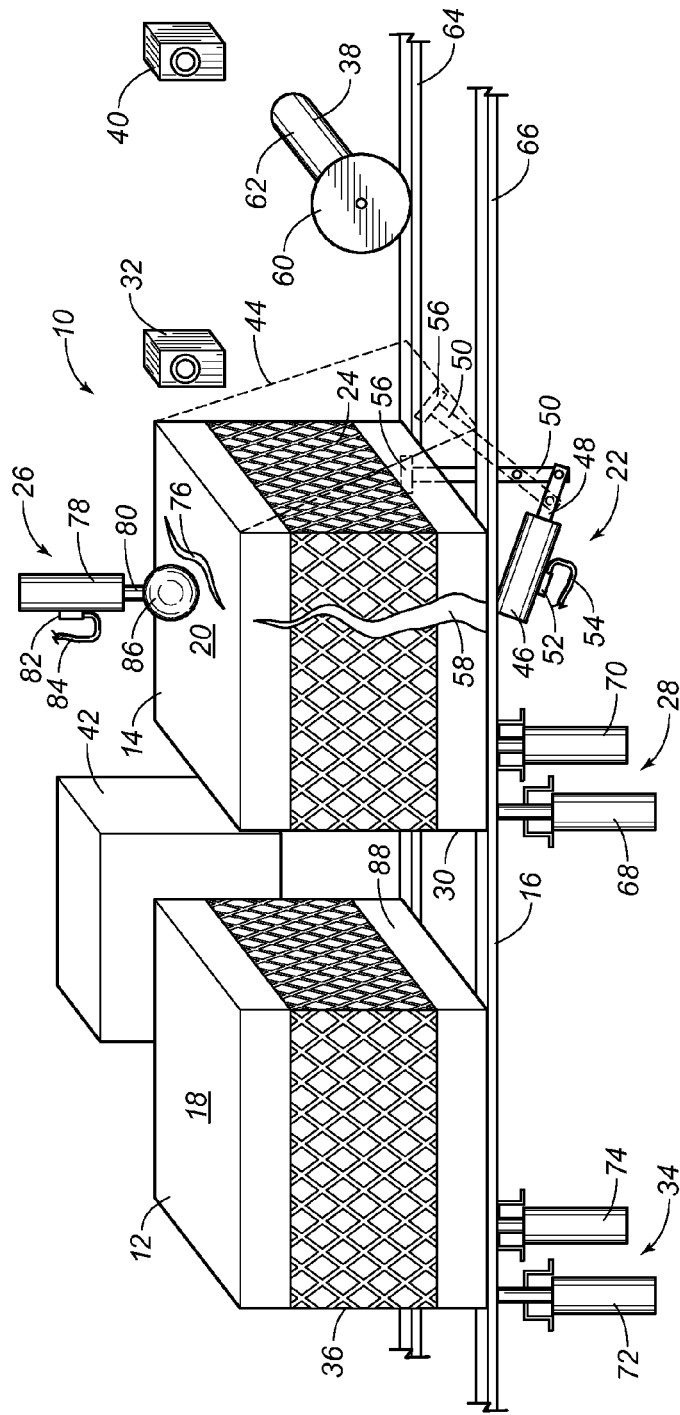
FIG. 4 shows a side perspective view of an inspecting system as used in the present invention.

Referring to FIG. 4, there is shown a perspective view of a prior art case inspecting means 10 for detecting a cracked or broken case. Cases 12 and 14 are in the nature of a polymeric lattice-wall case described in FIG. 1. The cases 12 and 14 are positioned on a conveyor 16 such that the open top end of the case 12 and 14 faces downwardly upon the conveyor 16. The closed-bottom ends 18 and 20 of the cases 12 and 14, respectively, face upwardly when the cases 12 and 14 are positioned on the conveyor 16. Case 14 is illustrated in a correct position for inspection and detection. Case 12 is positioned behind case 14 in a staging position prior to testing.

In FIG. 4, first ram 22 is positioned adjacent to the forward wall 24 of case 14. A second ram 26 is positioned adjacent to the closed bottom surface 20 of the case 14. Case positioning brakes 28 are arranged so as to be generally adjacent to the end wall 30 of case 14. An infrared positioning sensor 32 is directed generally transversely to the direction of the conveyor 16 and is directed toward the forward wall 24 of case 14. The case 12 is positioned in generally spaced relationship to the case 14 on the conveyor 16. Case separator brakes 34 are positioned generally adjacent to the back wall 36 of case 12. The case separator brakes 34 serve to retain the case 12 in spaced relationship to the case 14.

A broken case ejector 38 is arranged relative to the conveyor 16 and positioned so as to remove any broken cases passing thereby from the conveyor 16. An infrared positioning sensor 40 is positioned adjacent to the ejector 34 so as to indicate when the broken case is positioned in proximity to the ejector 38. A programmable logic controller 42 is cooperative with each of the elements of the apparatus 10. The programmable logic controller 42 will provide an indication when the first ram 22 has caused the wall 24 to deflect outwardly beyond a predetermined limit (as shown by the broken lines 44 in FIG. 4). As a result, a signal can then be sent to the ejector 38 in order to eject the case 14 from the conveyor 16 when the case 14 passes into a position acknowledged by the positioning sensor 40. Although not shown in FIG. 4, each of the elements associated with the apparatus 10 is interconnected together by way of the programmable logic controller 42.

In FIG. 4, the first ram 22 includes a cylinder 46 having a piston 48 extending outwardly therefrom. An arm 50 is pivotally connected to the piston 48. A microsensor 52 is connected to cylinder 46 so as to sense the amount of movement of the piston 48 within the cylinder 46. Although hydraulics or pneumatics can be used within the concept of the present invention, it is believed that the preferred embodiment of the present invention would be in the form of a pneumatic cylinder 46. Pneumatic conduit 54 can extend to the microsensor 52 so as to allow air to be introduced into the cylinder 46 for the actuation of the piston 48. The arm 50 is pivotally connected to the end of the piston 48. In a first position, the arm 50 is generally oriented vertically. The arm 50 has an abutment member 56 at an upper end thereof. In the upright position, the arm 50 will allow the case 14 to pass thereover. When the cylinder 46 is actuated, the piston 48 will be drawn inwardly of the cylinder 46 so as to cause the arm 50 to pivot in the manner shown by the arm illustrated in broken line fashion. The abutment member 56 will apply a force against the wall 24 so as to urge the wall 24 outwardly. If there is a crack, such as crack 58 in the case 14, then the wall 24 will move outwardly in the form of broken line wall 44. As a result, the sensor 52 will indicate that the piston 48 has moved inwardly beyond a predetermined limit and, as a result, the wall 24 has deflected outwardly beyond a desired amount. As a result, a signal can be transmitted to the programmable logic controller 42 to indicate that the case 14 is defective. Ultimately, the arm 50 will be retracted so as to allow the case 14 to move forward along conveyor 16 to the ejector 38. Programmable logic controller 42 will send a signal to the ejector 38 so as to remove the case 14 from the conveyor 16. Positioning sensor 40 will also send a signal to the programmable logic controller 42 to indicate when the case 14 has arrived at its desired position along conveyor 16 adjacent to the ejector 28.

The ejector 38 is also in the form of a pneumatic ram having a cylinder 60 and piston 62. In a first position, the piston 62 is suitably retracted so as to allow the case 14 to move in a proper position adjacent thereto. In a second position, the piston 62 will extend outwardly from the cylinder 60 so as to force the case 14 off of the conveyor 16.

Referring still to FIG. 4, the conveyor 16 can have a wide variety of configurations. Preferably, the cases 12 and 14 will ride along within angle irons 64 and 66. A suitable motive force, such as a chain, belt, linkage, or other type of the conveyor, will cause the cases 12 and 14 to move along within the angle irons 64 and 66.

When the positioning sensor 32 senses that the forward wall 24 of the case 14 is located in a desired position, the positioning brakes 28, in the form of pneumatic rams 68 and 70, will cause the piston to extend upwardly and to abut the interior of the back wall 30 of case 14. As a result, the case 14 will stop in its desired position while the conveyor 16 continues to move along. Since the case 12 is also moving along the conveyor 16, it is necessary for separator brakes 34, in the form pneumatic rams 72 and 74, to extend the pistons upwardly and engage the interior of the back wall 36 of the case 12. This will cause the case 12 to also stop along the conveyor 16 and to be suitably spaced from the case 14. Programmable logic controller 42 will control the operation of the pneumatic rams 68, 70, 72 and 74.

The prior art case inspecting system 10 in FIG. 4 also includes a second ram 26 positioned adjacent to the bottom 20 of the case 14. It is important to detect the integrity of the bottom 20 of each of the cases 12 and 14. If the bottom is cracked, then the case 14 will not have sufficient integrity to withstand the loads imparted thereto. In order to detect whether a crack has occurred on the bottom 14, the second ram 26 is particularly configured for acting on the bottom 14. A crack 76 can be seen in the bottom 20 of case 14. The second ram 26 also includes a cylinder 78 having a piston 80 extending outwardly therefrom. A microsensor 82 is connected to the cylinder 78 so as to determine the relative movement of the piston 80 with respect to the cylinder 78. A pneumatic conduit 84 connects with the cylinder 78 so as to supply air pressure to the ram 26. A roller 86 is positioned at the end of the piston 80 opposite the cylinder 78. When the ram 28 is actuated, the piston 80 will move outwardly so that the roller 86 exerts a force downwardly upon the bottom 20 of case 14. If the piston 80 deflects too greatly outwardly, then the microsensor 82 will send a signal to the programmable logic controller 42 that a crack has occurred in the bottom 20 of case 14. As a result, the case 14 will be properly ejected by the ejector 38 when it moves into position adjacent the positioning sensor 40.

The apparatus 10 shown in FIG. 4 can be part of a line operation where the cases will continue to passed to another location, such as for cleaning and/or filling. When the inspection has been completed and the case 14 shows adequate structural integrity, the ram 68 and 70 will cause the case 14 to be released therefrom by retracting the pistons associated therewith downwardly into the respective cylinders of the rams 68 and 70. At the same time, rams 72 and 74 will also release case 12 so that the conveyor 16 can move the case 12 into its desired position for testing. Positioning sensor 32 will then detect when the forward wall 88 is in its desired position for testing.

Referring to FIG. 5, there is shown a side elevational view of the preferred embodiment of the case positioner system 110 of the present invention. Cases 102 move along the conveyer 104. The conveyor 104 is translatably arranged relative to the frame 106. Case 100 is shown as being in an upended position, which is an incorrect position for a case inspecting means 10 shown in FIG. 4. Thus, the case 100 needs to be oriented into a corrected position like cases 102. The case positioner system 110 has a side projection 112 and a bottom projection 116. The side projection 112 is attached to frame 106 and positioned above the conveyer 104 in a position upstream of the bottom projection 116. The side projection 112 is movable between an inward position and an outward position. The side projection 112 shown in FIG. 5 is in the outward position. The bottom projection 116 is attached to the frame 106 and positioned below the conveyer 104. The bottom projection 116 is movable between an upward position and a downward position. The bottom projection 116 shown in FIG. 5 is in the downward position. An abutment member 118 is interconnected with the frame 106 and positioned above the conveyor 104. The abutment member 118 is movable between an upper position and a lower position. The abutment member 118 shown in FIG. 5 is in the upward position. A translation means 133 is connected to the bottom projection 116. The translation means 133 moves the bottom projection 116 upstream on the conveyor 104 when the abutment member 118 is in the lower position.

The abutment member 118 has a first piston-and-cylinder assembly 122 positioned on one side 134 of the conveyor 104. The first piston-and-cylinder assembly 122 has a pneumatic cylinder 123 with a coiled spring 121 therein. The spring 121 urges the piston of the piston-and-cylinder assembly 122 toward the upper position. The abutment member 118 is spaced above the conveyor 104 for a distance greater than a vertical dimension of the upended case 100 that is in the upended position. The abutment member 118 is also spaced above the conveyor 104 for a distance less than the vertical dimension of the case when in the upended position.

The translation means 133 has a carriage 128 that has the bottom projection 116 thereon. A track 130 is connected to the carriage 128 such that the carriage 128 moves therealong. The track 130 is positioned below the conveyor 104. An actuator means 129 is connected to the carriage 128 for moving the carriage 128 between a downstream position to an upstream position. The carriage 128 is shown in the upstream position in FIG. 5. A limit switch 132 is interconnected to the track 130 and positioned adjacent the carriage 128 when the carriage 128 is in the upstream position. The limit switch 132 is suitable for stopping the case 100 when in the upstream position.

The side projection 112 is attached to the frame 106. In FIG. 5, as the upended case 100 passes into the frame 106, the side projection 112 is in an outward position. The bottom projection 116 is in a downward position. The abutment member 118 is in an upper position.

A sensing means 149 is positioned downstream of the bottom projection 116. The sensing means 149 senses another case 105 downstream of the bottom projection 116. The sensing means 149 also moves the side projection 112 to the inward position when the another case 105 is sensed by the sensing means 149. The sensing means 149 also moves the side projection 112 to the outward projection when the another case 105 is not sensed by the sensing means 149. The sensing means 149 is a photo eye 150 that is positioned on the frame 106 above the conveyor 104.

A braking means 151 is attached by a bracket 156 to the frame 106. The braking means 151 is positioned upstream of the abutment member 118 on one side 134 of the conveyor 106. The braking means 151 has pneumatic actuator 154 on one side 134 of the conveyor 106 and an arm 152 extending outwardly of the pneumatic actuator 154 when the detecting means 147 detects the case 100 in the upended position. The braking means 151 blocks a movement of another case 103 on the conveyor 104 when the detecting means 147 detects the case 100 in the upended position. An arm 152 projects from the cylinder 154 so as to extend inwardly of the frame 106. The plunger 152 has an outer position adjacent the frame and an inner position that contacts the sides of cases passing thereby. The frame 106 is constructed so that both correctly-positioned cases 102, 103, 105 and upended case 100 can pass therein.

A detecting means 147 is positioned upstream of the bottom projection 116. The detecting means 147 detects the case 100 in the upended position. The detecting means 147 moves the bottom projection 116 to the upward position. The detecting means 147 also moves the abutment member 118 to the lower position when the case 100 in the upended position is sensed. The detecting means 147 is a photo eye 148 that is positioned above the conveyor 104 for a distance greater than a height of the case 100 in the corrected position above the conveyor 104 and less than a height of the case 100 in the upended position above the conveyor 104. The photo eye 148 detects upended case 100. If an upended case 100 is detected, the photo eye 148 activates the abutment member 118. That is, the abutment member 118 is moved from the upper position to the lower position. The bottom projection 116 is actuated from the downward position to the upward position when the photo eye 148 detects upended case 100. The carriage 128 moves the bottom projection 116 along the track 130 so that the bottom projection 116 contacts edge 140 of case 100 and pushes the case 100 so that the case 100 tilts to the corrected position. The carriage 128 moves along the track 130 until the carriage 128 hits the limit switch 132. The limit switch 132 retracts the bottom projection 116 to the downward position, returns the abutment member 118 to the upper position, and retracts braking means 151 so that case 103 again moves with the conveyor 104.

Referring to FIG. 6, there is shown a top view of the case positioner system 110 of the present invention. The abutment member 118 is in the upper position. The abutment member 118 has a first piston-and-cylinder assembly 122 on a side 134 of the frame 104 and a second piston-and-cylinder assembly 126 on the opposite side 135 of the frame 104. A cross-member 124 extends between the first piston-and-cylinder assembly 122 and the second piston-and-cylinder assembly 126 in spaced relation above the conveyor 104. The second piston-and-cylinder assembly 126 also has a pneumatic cylinder with a coiled spring therein. The cross-member 124 has a roller 120 rotatably mounted thereon.

The upended case 100 has moved along the conveyor 104 while case 103 remains in place. Because the photo eye 150 sees case 105, side projections 112 and 114 have been actuated from the outward position to the inward position so as to contact the edge 140 of case 100. The bottom projections 116 and 117 remain in the downward position. The upended case 100 moves along the conveyor 104 until the edge 140 of the case 100 contacts the side projections 112 and 114.

Referring to FIG. 7, there is shown a top view of the case position system 110, with the edge 140 of the case 100 contacting the side projections 112 and 114. Side projections 112 and 114 extend inwardly of the frame 106 in an inward position. The side projections 112 and 114 also stop the case 100 moving along conveyer 104. Case 105 continues to move past the photo eye 150. Once the photo eye 150 does not detect case 105 any more, the side projections 112 and 114 retract into the outward position. The bottom projections 116 and 117 remain in the downward position. In FIG. 7, the photo eye 148 detects the upended case 100.

Referring to FIG. 8, there is shown a side elevational view of the case positioner system 110, with the bottom projection 116 in the upward position. The roller 120 of the abutment member 118 is in the lower position so as to contact a corner of case 100. The photo eye 148 has actuated the bottom projections 116 and 117 so that they extend in an upward position. In the upward position, bottom projections 116 and 117 contact edge 140 of the case 100 moving on the conveyer 104. Case 105 continues moving along the conveyor 104. Because the photo eye 148 no longer detects the case 105, the side projections 112 and 114 are actuated to the outward position. Case 103 is still held by arms 152. Case 100 is held in place by bottom projections 116 and 117. The abutment member 118 is adjacent the corner 138 of the case 100. The conveyor 104 has a top surface 105. The bottom projection 116 has an end 119 that extends above the top surface 105 when the bottom projection 116 is in the upward position. The bottom projection 116 is below or even with the top surface 105 when in the downward position.

Figure 9:
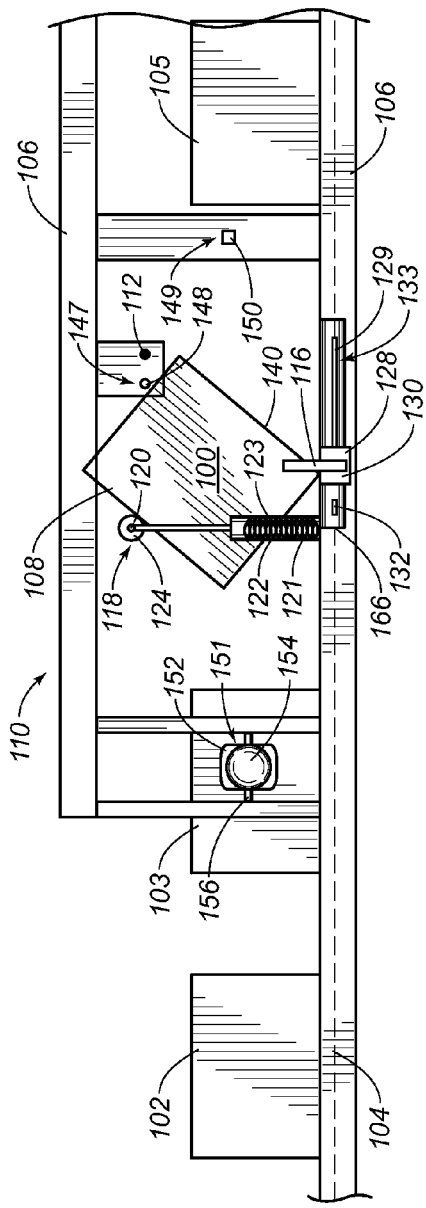
FIG. 9 shows a side elevational view of the case positioner system of the present invention, with the case tiled between the upended position and the corrected position.

Referring to FIG. 9, there is shown a side elevational view of the case positioner system 110 of the present invention, with the case 100 tilted between the upended position and the corrected position. The roller 120 is in the lower position. The side projections 112 and 114 are retracted to the outward position. The bottom projections 116 and 117 are in the upward position. The carriage 128 has moved along the track 130 so that the bottom projections 116 and 117 pushed the edge 140 of the case 100 backwards under the roller 120 of the abutment member 118. The roller 120 of the abutment member 118 exerts a downward force on the bottom 108 of the case 100. As the carriage 128 moves from the upstream position to the downstream position on the track 130, the carriage 128 contacts the limit switch 132. When the limit switch 132 is activated by the carriage 128, the abutment member 118 returns from the lower position to the upper position. The bottom projections 116 and 117 retract from the upward position to the downward position. The arms 152 retract from the inner position to the outer position.

Figure 10:
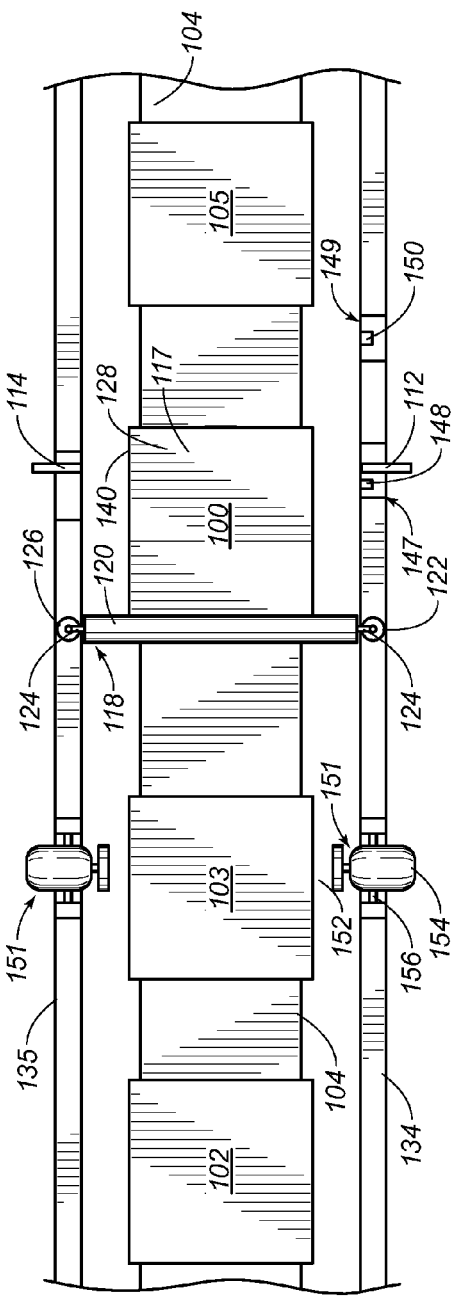
FIG. 10 shows a top view of the case positioner of the present invention after orienting the case from an upended position to a corrected position.

Referring to FIG. 10, there is shown a top view of the case positioner system 110 of the present invention after case 100 is oriented in the corrected position. The arms 152 have been retracted to the outer position so that cases 103 and 102 can pass thereby. Case 100 is positioned over the carriage 130 and bottom projections 116 and 117. The side projections 112 and 114 are in the outward position. The abutment member 118 is in the upper position.

Figure 11:
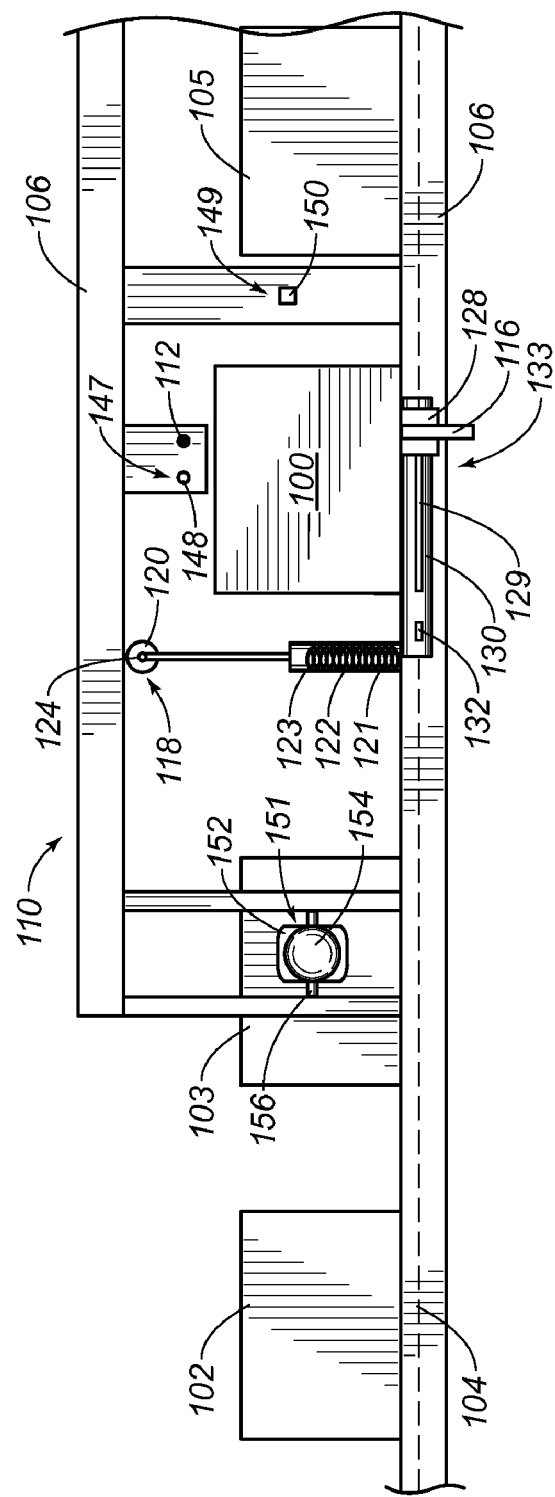
FIG. 11 shows a side elevational view of the case positioner of the present invention, with the upended case in a corrected position.

Referring to FIG. 11, there is shown a side elevational view of the case positioner system 110 of the present invention, with the case 100 in a corrected position. The abutment member 118 has returned from the lower position to the upper position. The bottom projection 116 has returned to the downward position. The side projection 112 has returned to an inward position.

The case inspecting means 10 shown in FIG. 4 can be used with the case positioning system 110 of the present invention. The conveyor 104 of the system 110 extends through the case inspecting means 10. The case inspecting means 10 tests an integrity of the side walls 144 of cases 100 and 102. In the present invention, the case inspecting means 10 is downstream of the side projections 112 and 114 and the bottom projections 116 and 117.

In the method of the present invention, case 100 is oriented from an upended position to a corrected position while moving along conveyor 104 by detecting the case 100 in the upended position with a first photo eye 146, actuating a plunger 152 inwardly to stop an upstream case 103 from moving on the conveyor 104, detecting a downstream case 105 with a third photo eye 150, actuating a side projection 112 attached to the frame 106 from an outward position to an inward position when the case 100 in the upended position is detected, the side projection 112 contacting an edge 140 of the case 100, detecting the case 100 in the upended position with a second photo eye 148, advancing a bottom projection 116 from a downward position to an upward position so as to contact the edge 140 of the case 100, contacting a bottom 108 of the case 100 with a roller member 120, urging the roller member 120 along the bottom 108 of the case 100 so as to pivot the case over the bottom projection 116 so as to rotate the case 100 from the upended position to the corrected position, contacting the edge 140 of the case 100 with the bottom projection 116, translating the bottom projection 116 on a carriage 128 along a track 130, exerting a downward force onto the bottom 108 of the case 100 with the roller member 120, pivoting the case 100 to the corrected position, conveying the case 100 in the corrected position to an inspecting location 10, and inspecting an integrity of the case 100 by applying a force against the bottom 108 of the case 100.

The foregoing disclosure and description of the invention is illustrative and explanatory thereof. Various changes in the details of the illustrated construction and method can be made within the scope of the present claims without departing from the true spirit of the invention. The present invention should only be limited by the following claims and their legal equivalents.

I claim:

1. A case positioner system for orienting a case from an upended position to a corrected position comprising:
    a frame;
    a conveyor translatably arranged relative to said frame;
    at least one bottom projection positioned below said conveyor, the bottom projection movable between an upward position and a downward position;
    an abutment member interconnected to said frame and positioned above said conveyor, said abutment member movable between an upper position and a lower position; and
    a translation means connected to the bottom projection for moving the bottom projection upstream on said conveyor when said abutment member is in said lower position.

2. The system of claim 1, said abutment member comprising:
    a first piston-and-cylinder assembly positioned on an one side of said conveyor;
    a second piston-and-cylinder assembly positioned on an opposite side of said conveyor; and
    a cross-member extending between said first piston-and-cylinder assembly and said second piston-and-cylinder assembly in spaced relation above said conveyor.

3. The system of claim 2, said cross-member having a roller rotatably mounted thereon.

4. The system of claim 2, each of said first and second piston-and-cylinder assemblies having a pneumatic cylinder with a coiled spring therein, said spring urging the piston toward said upper position.

5. The system of claim 1, said abutment member being spaced above said conveyor for a distance greater than a vertical dimension of the case when in the upended position, said abutment member being spaced above said conveyor for a distance less than said vertical dimension of the case when in the upended position.

6. The system of claim 1, said translation means comprising:
    a carriage having the bottom projection thereon;
    a track connected to said carriage such that said carriage moves therealong, said track positioned below said conveyor; and
    an actuator means connected to said carriage for moving said carriage between a downstream position to an upstream position.

7. The system of claim 6, further comprising:
    a limit switch interconnected to said track and positioned adjacent said upstream position, said limit switch suitable for stopping the case when in said upstream position.

8. The system of claim 1, further comprising:
at least one side projection positioned above said conveyor in a position upstream of the bottom projection, the side projection movable between an inward position and an outward position; and
a sensing means positioned downstream of the bottom projection, said sensing means for sensing another case downstream of the bottom projection, said sensing means for moving the side projection to said inward position when the another case is sensed by said sensing means, said sensing means for moving the side projection to said outward position when the another case is not sensed by said sensing means.

9. The system of claim 8, said sensing means being a photo eye positioned on said frame above said conveyor.

10. The system of claim 1, further comprising:
a detecting means positioned upstream of the bottom projection, said detecting means for detecting the case in the upended position, said detecting means for moving the bottom projection to said upward position and for moving said abutment member to said lower position when a case in an upended position is sensed.

11. The system of claim 10, said detecting means comprising:
a photo eye positioned above said conveyor a distance greater than a height of the case in the corrected position above said conveyor and less than a height of the case in the upended position above said conveyor.

12. The system of claim 10, further comprising:
a braking means positioned upstream of said abutment member, said braking means for blocking a movement of another case on said conveyor when said detecting means detects the case in the upended position.

13. The system of claim 12, said braking means comprising:
a pneumatic actuator positioned on one side of said conveyor; and
an arm extending outwardly of said pneumatic actuator when said detecting means detects the case in the upended position.

14. The system of claim 1, further comprising:
a case inspecting means having said conveyor extending therethrough, said case inspecting means for testing an integrity of a wall of the case, said case inspecting means being downstream of the bottom projection.

15. The system of claim 1, the case having a bottom and a plurality of side walls extending therefrom, each of the plurality of side walls having an edge opposite the bottom, the bottom projection suitable for contacting the edge when in said upward position, said abutment member suitable for contacting the bottom when in said lower position.

16. The system of claim 1, said conveyor having a top surface, the bottom projection having an end extending above said top surface when the bottom projection is in said upward position, the bottom projection being below or even with said top surface when in said downward position.

17. A method for orienting a case from an upended position to a corrected position as the case moves on a conveyor, the method comprising:
detecting the case when in the upended position;
moving a bottom projection upwardly into a position above a top surface of the conveyor so as to stop the movement of the case on the conveyor;
moving an abutment member downwardly in a position below a top surface of the case and rearwardly of the case;
translating said bottom projection upstream of the conveyor so as to move the case relative to the conveyor such that an upstream surface of the case contacts said abutment member; and
toppling the case by an interaction of the case with the translated bottom projection and the contact with said abutment member such that the case moves to the corrected position.

18. The method of claim 17, further comprising:
moving the bottom projection downwardly when the case is in the corrected position; and
moving the abutment member upwardly when the case is in the corrected position.

19. The method of claim 17, further comprising:
sensing a position of another case downstream of said bottom projection on the conveyor;
extending a side projection inwardly when the another case is sensed; and
stopping the movement of the upended case by said side projection when the another case is sensed.

20. The method of claim 17, further comprising:
braking a movement of another case upstream of the case in the upended position when the case in the upended position is detected.

* * * * *